(No Model.)
E. MURGATROYD.
SCOTCHING DEVICE FOR CART WHEELS.
No. 449,269. Patented Mar. 31, 1891.
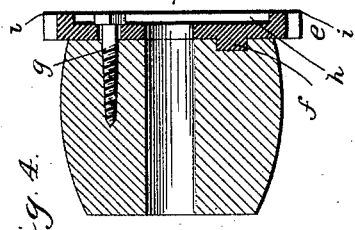
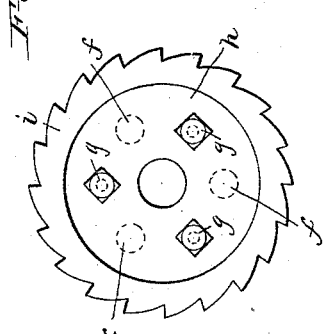
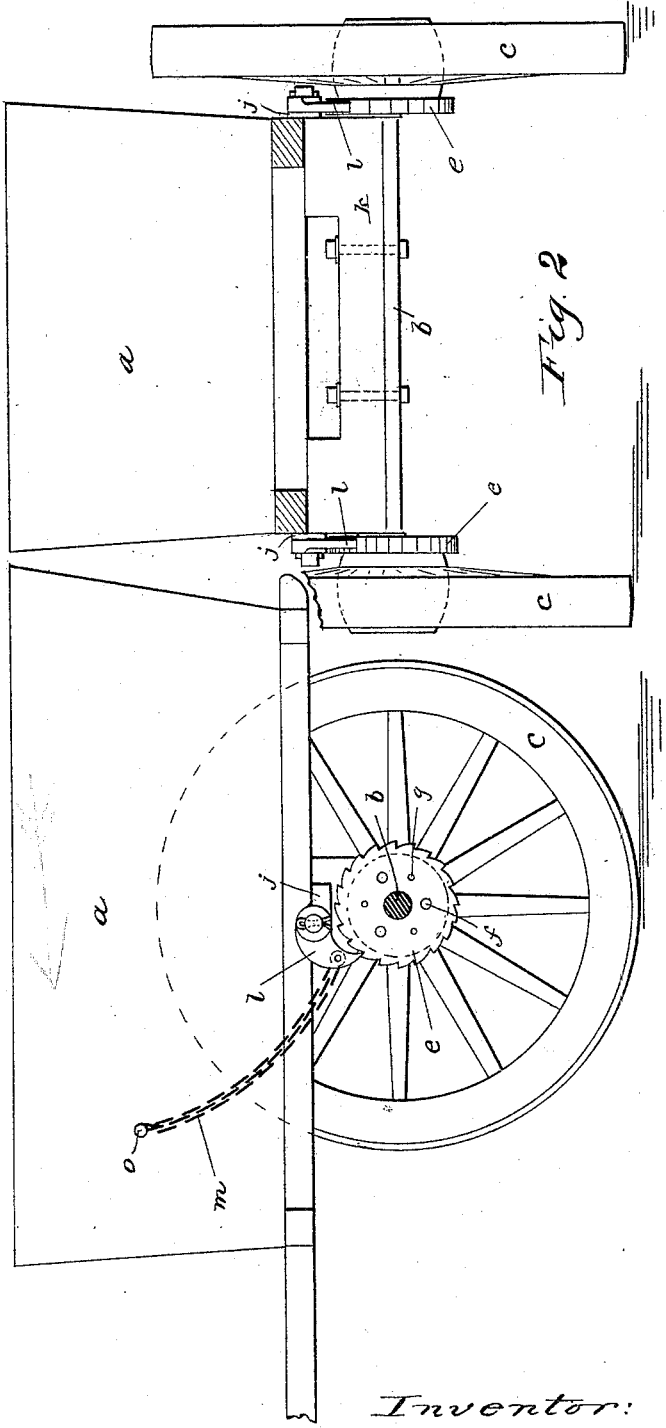
Witnesses:
L. M. Low
A. G. Thompson.
Inventor:
Edward Murgatroyd
by Richards & Co.
Attorneys.

United States Patent Office.

EDWARD MURGATROYD, OF COLNE, ENGLAND.

SCOTCHING DEVICE FOR CART-WHEELS.

SPECIFICATION forming part of Letters Patent No. 449,269, dated March 31, 1891.

Application filed November 19, 1888. Serial No. 291,302. (No model.) Patented in England March 31, 1888, No. 4,883.

*To all whom it may concern:*

Be it known that I, EDWARD MURGATROYD, a subject of the Queen of Great Britain and Ireland, residing at Colne, in the county of Lancaster, England, have invented certain Improvements in or Applicable to the Wheels of Carts, Wagons, Tram-Cars and other Vehicles to Prevent the Vehicle Running Back Down an Incline, (for which I have obtained a patent in Great Britain, No. 4,883, bearing date March 31, 1888,) of which the following is a specification.

This invention has for its object a simple means of automatically scotching the wheels of carts, wagons, tram-cars, and other vehicles, so as to prevent the same running back down an incline; and it consists in the use and application to the boss of the wheels of such vehicles of a ratchet-wheel with one, two, or more sets of teeth. Into the ratchet-wheel a pawl or pawls, mounted by preference upon the axle or other stationary part of the vehicle, can be placed in gear when ascending an incline, and thus the wheels of the vehicle are free to turn in the forward direction, but become scotched and effectually prevented turning in the other direction.

In the accompanying drawings, Figure 1 is a side view, and Fig. 2 a front view, of a cart or double-wheeled vehicle having my improved ratchet scotching apparatus applied thereto. Figs. 3 and 4 are detail views of the ratchet-plate.

In both views $a$ is the body of the vehicle, $b$ the axletree, and $c\ c$ the wheels. To the inner face of the boss of the wheels $c\ c$ on both sides of the vehicle I affix my improved ratchet plate or wheel $e$. (Shown separately, and on an enlarged scale, by front and side sectional views in Figs. 3 and 4.) This affixing is most effectually and securely performed by having, say, three pins or studs $f$, cast or otherwise secured on the inner face of the ratchet-wheel, (see Fig. 3,) so as to be fitted into the wooden boss of the wheel, and thus such projections take the strain off the coach-screws $g$, which are screwed direct into such wooden bosses. The heads of these screws are by preference arranged so as to lie in the recess $h$ and not to project beyond or much beyond the rim or outer edge $i$ of the ratchet-wheel.

Upon a bracket $j$, secured to each extremity of the wooden axle-beam $k$ or upon any other suitable part of the body of the cart, I mount a ratchet-pawl $l$, which gears with its corresponding ratchet-wheel $e$, and so permits the wheels $c\ c$ of the cart to revolve in the forward direction, but effectually and automatically scotches and prevents the same turning in the other direction. In this manner I not only insure that the vehicle shall have no tendency to run backward, but enable the driver to stop to rest his horse at any point in ascending an incline. By having a chain $m$, connected at one extremity to a pin upon the side of the pawl and its other extremity carried upward and hung upon a bracket or peg $o$, facility is afforded for supporting the pawl $l$ out of contact with the wheel $e$, say, when traveling a level country. I prefer to construct the ratchet wheels or plates $e$ of cast-steel or of annealed cast-iron, and in some cases I construct the rim with one, two, or more sets of ratchet-teeth, or I employ two or more pawls of varying length, so as to obtain a finer and quicker scotching action.

As applied to perambulators and invalid-carriages this invention renders it possible for such vehicles to be left standing safely on an inclined foot or road way, or even in case of ascending an incline by turning the back of the vehicle to face down the incline the ratchet-wheels are automatically brought into action. It will be apparent that a ratchet-wheel could also be applied in the reverse direction to prevent the perambulator running forward when its pawl is allowed to drop into gear. In the case of wheels affixed upon and revolving with their axles, as in tram-cars and some descriptions of perambulators, the ratchet-wheel could be applied in any convenient position along the length of the axle.

What I claim as my invention, and desire to secure by Letters Patent, is—

The combination of the ratchet wheels or plates e, affixed to the bosses of the wheels of carts, wagons, and other vehicles, with pawls l, mounted upon the axletrees or other stationary part of such vehicles and capable of engaging with said ratchet wheels or plates and so to act as automatic scotching apparatus to prevent the vehicle running backward in ascending an incline, and of a chain m, adapted to lift and hold the pawl out of gear, as and for the purposes described.

In testimony whereof I affix my signature to the foregoing specification.

EDWARD MURGATROYD.

Witnesses:
JOHN G. WILSON,
WALTER GUNN.